Apr. 3, 1923. 1,450,368
F. E. HILT
EGG TRAY
Filed Oct. 14, 1919
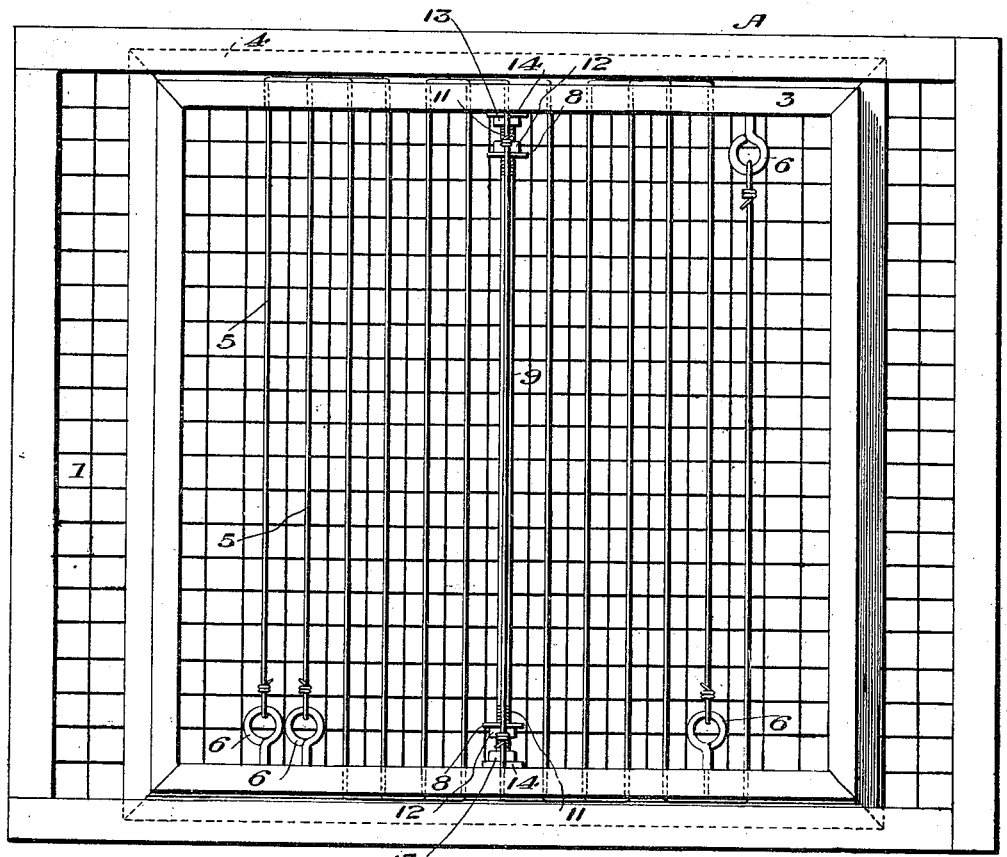
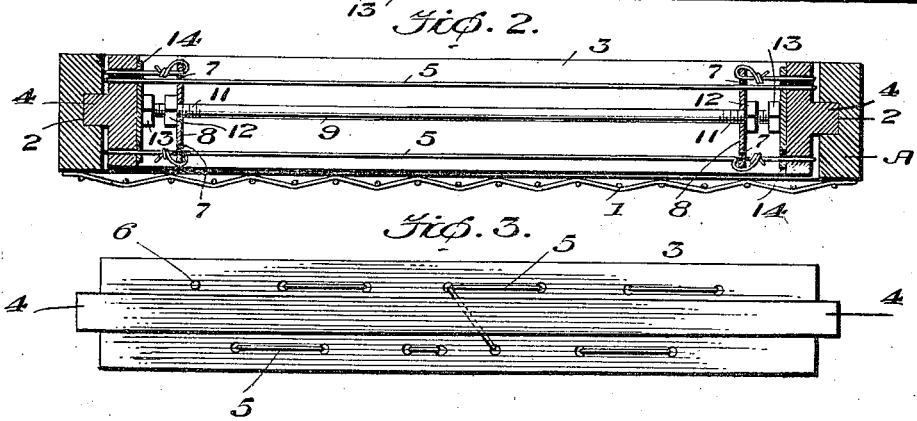

Patented Apr. 3, 1923.

1,450,368

UNITED STATES PATENT OFFICE.

FRANK E. HILT, OF LYONS, KANSAS.

EGG TRAY.

Application filed October 14, 1919. Serial No. 330,568.

*To all whom it may concern:*

Be it known that FRANK E. HILT, a citizen of the United States, residing at Lyons, in the county of Rice and State of Kansas, has invented certain new and useful Improvements in Egg Trays, of which the following is a specification.

My invention relates to an improvement in egg trays and the object is to provide an improved tray for supporting two tiers of eggs one above the other and further to provide a tray which can be moved back and forth in its frame and by so doing turn the eggs by frictional contact between the bottom of the frame and the lower tier of eggs resting thereon which tier of eggs turns the upper tier of eggs by frictional contact.

Another object is to provide means for applying tension to the cross wires of the tray.

In the accompanying drawings—

Figure 1, is a plan view of my improved tray,

Figure 2, is a section through the tray and frame.

Figure 3, is an end view of the tray.

A, is a tray frame having a recticulating bottom 1, and the inner faces of the sides and ends provided with grooves 2.

The numeral 3, represents an egg tray which comprises an outer frame having the tongues 4, adapted to fit the grooves 2, of the tray frame so that the tray can be slid back and forth in the frame, the width of the frame corresponding to the frame of the tray and the length being greater than the length of the tray for that purpose. Strung across the egg tray frame are the wires 5. There may be several of these and in the construction shown there are four of these wires, two forming the lower tier and two the upper tier and they are preferably in staggered arrangement in the two tiers or planes, that is to say, alternately arranged.

One end of each wire may be connected with a screw eye 6, of which there are four shown which screw into the opposite sides of the tray frame and have the outer ends of the wires screwed thereto and by turning these screw eyes tension may be applied to the outer ends of the wires.

The inner ends of the four wires shown extend to a point approximately at the center of the frame after having been passed back and forth across the frame and in and out through the hole 7, to a plate 8. There are two of these plates 8, and the inner ends of the several wires are connected to the opposite ends thereof. These plates are loosely mounted on a rod 9, which extends across the frame of the tray and has right and left screw threads 11 and 11, at its opposite ends where the plates 8, are loosely mounted.

Nuts 12, are screwed on to these threads on the outer sides of the plates 8, and by either screwing these up against the plates or by turning the rod itself, the plates may be moved inwardly towards the center of the tray or the rod itself might be turned in the nuts to force the plates inwardly and thus apply tension to the inner ends of the four wires simultaneously in that way drawing them through the holes and tightening them to the desired tension.

Additional nuts 13, screw up against the plates 14, on the inner faces of the opposite sides of the frame of the tray.

Thus between the center rod and its plates and ends and the connection of the inner ends of the wires to said plates, and the outer ends of the wires to the screw eyes, it is possible to tighten or loosen the wires quickly and conveniently from either end and by having a common means at the center for stretching them which may be sufficient to supply tension throughout the entire length of the wires, it saves a great deal of time and labor.

The eggs are placed in two tiers, one above the other, resting on the wire as well as in contact with one another and the lower ones in contact with the reticulated bottom of the tray frame so that when it is desired to turn the eggs the entire complement of the tray is turned by simply sliding the tray endwise in its frame.

The action of turning the eggs is caused by moving the inside tray 3 back and forth within the outer tray A, the tongue and groove serving as a guide for the purpose. The difference in length between the two trays, or in other words the travel of the inner tray, is just sufficient to give the eggs a half turn. By sliding the inner tray 3 in one direction, it turns the eggs once, and by pushing it in the opposite direction it turns them again, and so on, the wires of the tray being located between rows of eggs. It is the action of the lower row of eggs on the upper row of eggs that turns the top eggs. The cross-wires of the upper tray merely keep the eggs in line with the lower eggs.

I claim,

1. An egg tray comprising a frame, continuous wires stretching thereacross and extending loosely through holes in opposite sides thereof, means with which the ends of the wires are connected for applying tension thereto, means comprising a rod having plates loosely mounted thereon with which ends of the wires are connected, and means on the rod for moving said plates along the rod to apply tension to the wires connected with said plates.

2. An egg tray comprising a frame, continuous wires extending thereacross and loosely through holes in the opposite side of said frame, screw eyes connecting the outer end of said wires to the frame, a rod extending across the frame parallel with the wires and having threaded ends, plates loosely mounted on the rod to which the inner ends of the wires are secured and nuts mounted to turn on the threads of the rod back of the plates for moving the plates along the rods as the nuts are turned on the rod to apply tension to the wires connected therewith.

In testimony whereof I affix my signature.

FRANK E. HILT.